United States Patent
Aoyama et al.

(10) Patent No.: US 10,793,696 B2
(45) Date of Patent: Oct. 6, 2020

(54) POLYOLEFIN COMPOSITION CONTAINING HYGROSCOPIC INORGANIC FILLER, AND MOLDED BODY USING SAID POLYOLEFIN COMPOSITION

(71) Applicant: Tomita Pharmaceutical Co., Ltd., Naruto-shi, Tokushima (JP)

(72) Inventors: Hideyuki Aoyama, Naruto (JP); Yoshiyasu Bando, Naruto (JP); Masanori Sumi, Naruto (JP); Masaya Uemoto, Naruto (JP); Makoto Fujii, Naruto (JP); Seiji Sato, Naruto (JP)

(73) Assignee: Tomita Pharmaceutical Co., Ltd., Naruto-shi, Tokushima (JP)

( * ) Notice: Subject to any disclaimer, the term of this patent is extended or adjusted under 35 U.S.C. 154(b) by 199 days.

(21) Appl. No.: 15/545,634

(22) PCT Filed: Jan. 19, 2016

(86) PCT No.: PCT/JP2016/051365
§ 371 (c)(1),
(2) Date: Jul. 21, 2017

(87) PCT Pub. No.: WO2016/117529
PCT Pub. Date: Jul. 28, 2016

(65) Prior Publication Data
US 2018/0282505 A1    Oct. 4, 2018

(30) Foreign Application Priority Data
Jan. 23, 2015  (JP) .................. 2015-011392

(51) Int. Cl.
| C08K 3/30 | (2006.01) |
|---|---|
| B32B 27/32 | (2006.01) |
| B65D 65/40 | (2006.01) |
| B32B 9/00 | (2006.01) |
| C08L 23/06 | (2006.01) |
| B32B 1/02 | (2006.01) |
| B32B 27/20 | (2006.01) |
| B65D 81/26 | (2006.01) |
| C08J 3/20 | (2006.01) |
| C08J 5/18 | (2006.01) |
| C08K 3/013 | (2018.01) |

(52) U.S. Cl.
CPC .................. *C08K 3/30* (2013.01); *B32B 1/02* (2013.01); *B32B 9/00* (2013.01); *B32B 27/20* (2013.01); *B32B 27/32* (2013.01); *B65D 65/40* (2013.01); *B65D 81/264* (2013.01); *C08J 3/203* (2013.01); *C08J 5/18* (2013.01); *C08L 23/06* (2013.01); *B32B 2439/70* (2013.01); *B32B 2439/80* (2013.01); *C08J 2323/06* (2013.01); *C08K 3/013* (2018.01); *C08K 2003/3063* (2013.01)

(58) Field of Classification Search
CPC .......... B32B 9/00; B32B 27/32; B32B 27/20; B32B 1/02; B32B 2439/80; B32B 2439/70; B65D 65/40; B65D 81/264; C08K 3/30; C08K 2003/3063; C08K 3/013; C08J 3/203; C08J 5/18; C08J 2323/06; C08L 23/06
USPC ........................................................ 524/423
See application file for complete search history.

(56) References Cited

U.S. PATENT DOCUMENTS

| 5,078,909 A * | 1/1992 | Shigeta ............. B01D 53/28 |
|---|---|---|
| | | 252/194 |
| 2008/0058205 A1 * | 3/2008 | Uegaki ............. B01D 53/02 |
| | | 502/410 |
| 2011/0028605 A1 | 2/2011 | Nelson et al. |
| 2014/0171571 A1 | 6/2014 | Kayama et al. |
| 2016/0060423 A1 | 3/2016 | Nomura et al. |

FOREIGN PATENT DOCUMENTS

| JP | H03-109916 A | 5/1991 |
|---|---|---|
| JP | H03-109917 A | 5/1991 |
| JP | H05-95871 A | 4/1993 |
| JP | 2007-039644 A | 2/2007 |
| JP | 2008-056784 A | 3/2008 |
| JP | 2011-516638 A | 5/2011 |
| JP | H05-039379 B2 | 10/2012 |
| JP | 2014-189772 A | 10/2014 |
| WO | WO 2013/011941 A1 | 1/2013 |

OTHER PUBLICATIONS

Kawamura, et al. 1997 "Residue and release of antioxidants and ultraviolet stabilizers in polyethylene products in contact with foodstuffs" *Journal of Food Sanitation* 38(1): 27-33.

Suzuki, et al. 1995 "Erucic amide and oleic amide contamination of bicarbonate sodium powder" *Journal of Dialysis* 28(7): 1055-1062.

* cited by examiner

*Primary Examiner* — Angela C Scott
(74) *Attorney, Agent, or Firm* — Knobbe, Martens, Olson & Bear, LLP

(57) ABSTRACT

An object of the present invention is to provide a polyolefin composition prepared by kneading a hygroscopic inorganic filler into a polyolefin, without substantially using an additive such as a dispersant or an antioxidant, the polyolefin composition having good dispersibility of the hygroscopic inorganic filler as well as excellent moldability. By kneading anhydrous magnesium sulfate as a hygroscopic inorganic filler into a polyolefin, without substantially adding an additive such as a dispersant or an antioxidant, and by setting the moisture content in the kneaded product to 0.1 wt % or less, a polyolefin composition having good dispersibility of anhydrous magnesium sulfate as well as excellent moldability can be obtained.

13 Claims, 1 Drawing Sheet

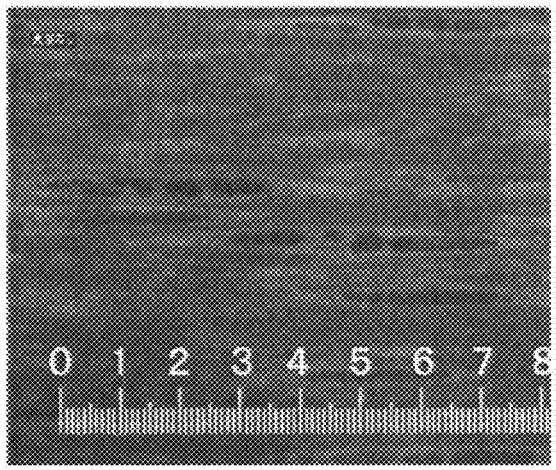
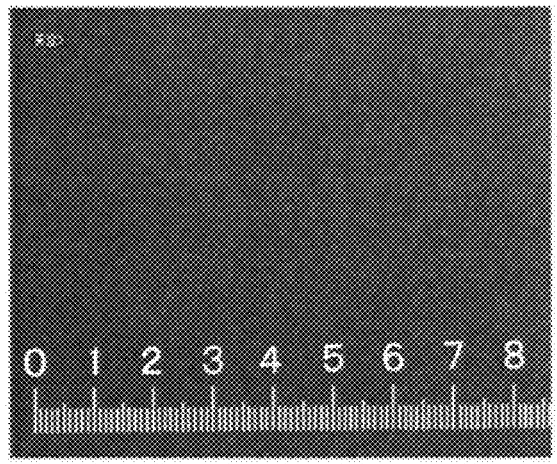
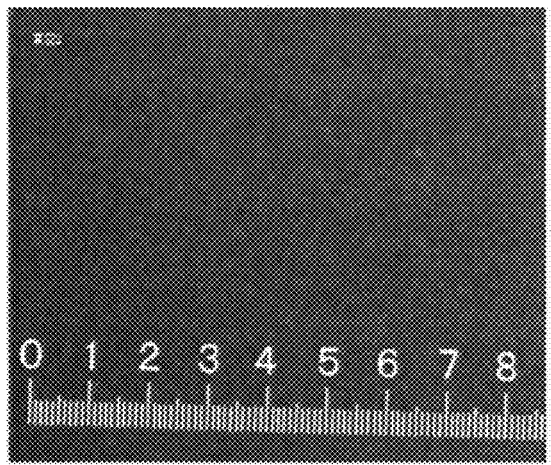
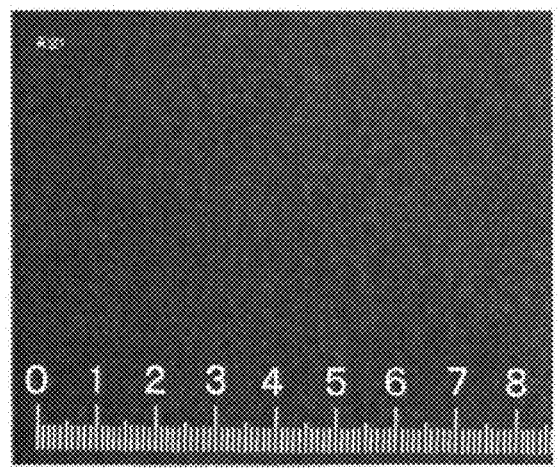

POLYOLEFIN COMPOSITION CONTAINING HYGROSCOPIC INORGANIC FILLER, AND MOLDED BODY USING SAID POLYOLEFIN COMPOSITION

TECHNICAL FIELD

The present invention relates to a polyolefin composition containing a hygroscopic inorganic filler. More specifically, the present invention relates to a polyolefin composition containing anhydrous magnesium sulfate as a hygroscopic inorganic filler, and substantially free of an additive other than anhydrous magnesium sulfate, which can inhibit bleed-out of an additive, and has excellent moldability and good dispersibility of anhydrous magnesium sulfate. Furthermore, the present invention relates to a molded article molded from the polyolefin composition.

BACKGROUND ART

Pharmaceutical products, food products, and raw materials thereof, upon absorption of moisture in the air, may lose their product appearances, and in particular, pharmaceutical products and pharmaceutical raw materials, for example, may lose the activity of their active ingredients, or may undergo a significant loss of their functions due to aggregation or solidification. Thus, in a package for a product that requires the prevention of moisture absorption, a desiccant or a deoxidant is typically placed with the product to provide protection against moisture with a barrier film, for example, that blocks outside air. Silica gels or zeolites, lime, and the like are widely used as such desiccants.

Meanwhile, for preventing moisture absorption in products that require the prevention of moisture absorption, packaging bodies formed of a resin raw material prepared by kneading a hygroscopic raw material therein have been developed. Patent Literatures 1 and 2, for example, disclose that a molded article molded from a desiccant composition containing, per 100 parts by weight of a thermoplastic resin such as a polyolefin, 5 to 400 parts by weight of a hygroscopic agent such as $MgSO_4.nH_2O$ ($0 \leq n \leq 3$), has excellent hygroscopicity and moisture retention, and is therefore useful as a packaging body for a product that requires the prevention of moisture absorption. Conventionally, kneading of a hygroscopic inorganic filler such as magnesium sulfate into a thermoplastic resin typically involves adding 5 wt % or less of a dispersant such as a fatty acid amide. In the prior art, if an additive such as a dispersant or an antioxidant is not added when kneading a hygroscopic inorganic filler into a thermoplastic resin, the hygroscopic inorganic filler cannot be homogeneously dispersed in the thermoplastic resin, leading to decreased moldability. In this case, when the resulting material is molded into a molded article such as a film or a sheet, defects such as fish eyes due to aggregated particles occur as typical forms of poor dispersion. This impairs the appearance of the molded article, and simultaneously affects the hygroscopic function per se. Furthermore, if a hygroscopic inorganic filler is kneaded into a thermoplastic resin using a twin-screw extruder without adding these additives, adhesion of masses called "drool" to the dice often causes deterioration of the continuity of strand molding. Thus, the prior art essentially requires the use of an additive such as a dispersant or an antioxidant in a thermoplastic resin into which a hygroscopic inorganic filler has been kneaded.

An additive such as a dispersant or an antioxidant, however, readily bleeds out of a molded article, and is transferred (penetrates) into its contents such as a pharmaceutical product, a food product, or a raw material thereof, to cause discoloration of the appearance of the contents, formation of water-insoluble matter, decomposition of the active ingredient, and contamination with the dispersant or antioxidant (see, for example, Non Patent Literatures 1 and 2). In particular, these problems due to the bleed-out of an additive become more noticeable as the storage period increases. For example, even a simple inorganic substance such as sodium chloride, which is widely used as a pharmaceutical raw material, will be contaminated with an additive, if it is stored packed in a film packaging body made of polyethylene that contains an additive such as a dispersant or an antioxidant. If such an inorganic substance contaminated with an additive is dissolved and filtered before use, soluble matter will form during dissolution, or the filtration rate will significantly decrease, or the lifetime of the filtration filter will decrease. In particular, such contamination with an additive causes a serious problem for contents that need to have a high purity (for example, a pharmaceutical product or a pharmaceutical raw material, particularly a raw material used as a component of an infusion or a dialysis fluid).

Thus, although the production of a thermoplastic resin into which a hygroscopic inorganic filler has been kneaded essentially requires the use of an additive such as a dispersant or an antioxidant, there is a need for a packaging body substantially free of such an additive for housing contents such as a pharmaceutical product, a food product, or a raw material thereof.

CITATION LIST

Patent Literature

Patent Literature 1: JP H3-109916 A
Patent Literature 2: JP H3-109917 A

Non Patent Literature

Non Patent Literature 1: Yoshihumi SUZUKI et al., "Erucic amide and oleic amide contamination of bicarbonate sodium powder", Journal of Japanese Society for Dialysis Therapy 28 (7), p. 1055-1062, 1995
Non Patent Literature 2: Yoko KAWAMURA et al., "Residue and release of antioxidants and ultraviolet stabilizers in polyethylene products in contact with foodstuffs", Journal of the Food Hygienic Society of Japan 38 (1), p. 27-33, 1997

SUMMARY OF INVENTION

Technical Problem

An object of the present invention is to provide a polyolefin composition prepared by kneading a hygroscopic inorganic filler into a polyolefin, without substantially using an additive such as a dispersant or an antioxidant, the polyolefin composition having good dispersibility of the hygroscopic inorganic filler as well as excellent moldability. Another object of the present invention is to provide a molded article such as a packaging body from the polyolefin composition.

Solution to Problem

The present inventors conducted extensive research to solve the aforementioned problem, and found that, by kneading anhydrous magnesium sulfate as a hygroscopic inorganic filler into a polyolefin, without substantially adding an additive such as a dispersant or an antioxidant, and by setting the moisture content in the kneaded product to 0.1 wt % or less, a polyolefin composition having good dispersibility of anhydrous magnesium sulfate as well as excellent moldability can be obtained. The present inventors then ascertained that because the polyolefin composition is substantially free of an additive such as a dispersant or an antioxidant, a packaging body molded from the polyolefin composition does not experience bleed-out of an additive, and can inhibit contamination of the contents. The present invention has been completed by conducting further research based on these findings.

In summary, the present invention provides aspects of invention as itemized below.

Item 1. A polyolefin composition, which is a kneaded product of a polyolefin and anhydrous magnesium sulfate, the polyolefin composition being substantially free of an additive other than anhydrous magnesium sulfate, and having a moisture content of 0.1 wt % or less.

Item 2. The polyolefin composition according to item 1, wherein the polyolefin is polyethylene.

Item 3. The polyolefin composition according to item 1 or 2, wherein a content of the anhydrous magnesium sulfate is 5 to 60 wt %.

Item 4. A molded article molded from the polyolefin composition according to any one of items 1 to 3.

Item 5. The molded article according to item 4, which is a bag- or bottle-shaped packaging body.

Item 6. The molded article according to item 5, wherein a resin layer formed of a polyolefin free of an additive is provided on one or both surfaces of a hygroscopic layer, the hygroscopic layer being formed of a molded article prepared by molding the polyolefin composition according to any one of items 1 to 3 into a film or a sheet.

Item 7. The molded article according to item 6, wherein a barrier layer formed of metal foil or a vapor-deposited film of an inorganic compound is provided on an outer surface of the hygroscopic layer.

Item 8. The molded article according to any one of items 5 to 7, which is a packaging body for use in housing a pharmaceutical, a food product, or a raw material thereof.

Item 9. The molded article according to any one of items 5 to 8, which is a packaging body for use in housing a powdery dialysis agent, a raw material of a dialysis agent, or a raw material of an infusion.

Item 10. A method for producing a polyolefin composition comprising the step of:

kneading anhydrous magnesium sulfate into a polyolefin in a molten state, wherein the kneading is performed under conditions that provide a moisture content of 0.1 wt % or less in the resulting kneaded product, and an additive other than anhydrous magnesium sulfate is not substantially added.

Item 11. The method according to item 10, wherein the kneading is performed in a pressure atmosphere at −65 Kpa or less.

Advantageous Effects of Invention

In the polyolefin composition according to the present invention, anhydrous magnesium sulfate as a hygroscopic inorganic filler can be dispersed well, without substantially using an additive other than anhydrous magnesium sulfate. Thus, the polyolefin composition has good moldability, and even when it is molded into a film or a sheet, it can provide a molded article of good quality, without causing pinholes and the like, by inhibiting aggregation of anhydrous magnesium sulfate.

Furthermore, a packaging body molded from the polyolefin composition of the present invention exhibits excellent hygroscopic performance derived from anhydrous magnesium sulfate, and is substantially free of an additive other than anhydrous magnesium sulfate. Thus, the packaging body can inhibit bleed-out of an additive, and can thereby safely store the contents such as a pharmaceutical product, a food product, or a raw material thereof.

BRIEF DESCRIPTION OF DRAWINGS

FIG. 1 shows images taken by microscopic observation of monolayer films prepared in (A) comparative Example 8 (minimum scale value: 100 μm). (B) Example 4 (minimum scale value: 100 μm). (C) Example 5 (minimum scale value: 100 μm) and (D) Example 6 (minimum scale value: 100 μm).

DESCRIPTION OF EMBODIMENTS

1. Polyolefin Composition

A polyolefin composition of the present invention is a kneaded product of a polyolefin and anhydrous magnesium sulfate, which is substantially free of an additive other than anhydrous magnesium sulfate, and has a moisture content of 0.1 wt % or less. Thus, a polyolefin composition having good dispersibility of anhydrous magnesium sulfate as well as excellent moldability can be obtained by kneading anhydrous magnesium sulfate, selected from among hygroscopic inorganic fillers, into a polyolefin, without substantially adding an additive other than anhydrous magnesium sulfate, and by setting the moisture content in the kneaded product to 0.1 wt % or less. The polyolefin composition of the present invention will be described hereinafter in detail.

Examples of polyolefins used in the present invention include, but are not particularly limited to, polyethylene, polypropylene, and polybutylene. Of these polyolefins, polyethylene, which is a resin that is relatively additive-free, may be preferred, from the viewpoint of moldability and dispersibility of anhydrous magnesium sulfate, for example. As polyethylene, any of low density polyethylene (LDPE), linear low density polyethylene (LLDPE), and high density polyethylene (HDPE), for example, may be used; however, low density polyethylene may be preferred, from the viewpoint of moldability and dispersibility of anhydrous magnesium sulfate, for example.

In the polyolefin composition of the present invention, the polyolefin content may be 40 to 95 wt %, for example, preferably 50 to 80 wt %, and more preferably 60 to 80 wt %, although it may be appropriately set, depending on the use of the polyolefin composition, for example.

The polyolefin composition of the present invention contains anhydrous magnesium sulfate as a hygroscopic inorganic filler. The mean particle diameter of anhydrous magnesium sulfate used in the present invention may be preferably 1 to 30 μm, more preferably 1 to 20 μm, and particularly preferably 1 to 10 μm, although not particularly limited thereto, from the viewpoint of dispersibility in the polyolefin. As used herein, the mean particle diameter of anhydrous magnesium sulfate refers to a cumulative 50% diameter evaluated from a cumulative particle size distribution by weight as measured with a laser diffraction/scattering particle size distribution measuring apparatus.

Moreover, in order to satisfy the below-described moisture content in the polyolefin composition of the present invention, the moisture content in anhydrous magnesium sulfate per se that is to be kneaded as a raw material is preferably smaller, i.e., particularly 2 wt % or less, and more preferably 1 wt % or less.

Anhydrous magnesium sulfate to be kneaded as a raw material in the present invention can be typically obtained by drying and firing crystalline magnesium sulfate (heptahydrate), and subsequently grinding the crystalline magnesium sulfate with a pulverizer to achieve the above-mentioned mean particle diameter. Firing crystalline magnesium sulfate (heptahydrate) at a temperature of 200° C. or higher, preferably 300 to 700° C., can typically provide anhydrous magnesium sulfate having a moisture content of approximately 1 wt % or less. Furthermore, because the fired anhydrous magnesium sulfate readily absorbs moisture, the fired anhydrous magnesium sulfate is preferably ground in the presence of dry air having an absolute humidity of approximately 10 g/kg DA or less. By means of firing and grinding as described above, anhydrous magnesium sulfate that readily disperses in the polyolefin can be obtained.

In the polyolefin composition of the present invention, the content of anhydrous magnesium sulfate may be 5 to 60 wt %, for example, preferably 20 to 50 wt %, and more preferably 20 to 40 wt %, although it may be appropriately set, depending on the use of the polyolefin composition and the hygroscopic properties to be imparted, for example.

The polyolefin composition of the present invention is substantially free of additives such as a dispersant, an antioxidant, a foaming agent, a lubricant, and a colorant (additives other than anhydrous magnesium sulfate). Because the polyolefin composition of the present invention is thus substantially free of an additive other than anhydrous magnesium sulfate, a molded article molded from the polyolefin composition of the present invention can prevent bleed-out of an additive. As used herein, the phrase "substantially free of an additive other than anhydrous magnesium sulfate" means that the polyolefin composition of the present invention does not contain such an additive, or contains such an additive only in an amount such that the additive cannot exhibit its inherent function. Specifically, the phrase "substantially free of an additive other than anhydrous magnesium sulfate" means that the total content of an additive other than anhydrous magnesium sulfate in the polyolefin composition of the present invention is 0.04 wt % or less, preferably 0.01 wt % or less, and more preferably 0 wt %.

The moisture content in the polyolefin composition of the present invention is set to 0.1 wt % or less. When such a moisture content is satisfied, the dispersibility of anhydrous magnesium sulfate can be improved without the inclusion of an additive other than anhydrous magnesium sulfate, and a polyolefin composition having excellent hygroscopicity as well as moldability can be obtained. From the viewpoint of further improving the dispersibility of anhydrous magnesium sulfate as well as moldability, the moisture content in the polyolefin composition of the present invention may be preferably 0 to 0.1 wt %, and more preferably 0 to 0.09 wt %. As used herein, the moisture content refers to a value measured using a Karl Fischer automatic moisture meter with a vaporizer (250° C.).

The polyolefin composition of the present invention is a kneaded product of a polyolefin and anhydrous magnesium sulfate, and is produced by kneading anhydrous magnesium sulfate into a molten polyolefin so that the above-mentioned moisture content is satisfied. Note, however, that because the polyolefin and anhydrous magnesium sulfate each hold moisture, the above-mentioned moisture content cannot be satisfied merely by kneading the polyolefin and anhydrous magnesium sulfate, which will only result in a polyolefin composition having low dispersibility of anhydrous magnesium sulfate and poor moldability. Thus, in the present invention, a polyolefin composition that satisfies the above-mentioned moisture content can be obtained by kneading the polyolefin and anhydrous magnesium sulfate under reduced pressure conditions, thereby removing moisture during kneading.

The pressure atmosphere during kneading of the polyolefin and anhydrous magnesium sulfate may be specifically −65 Kpa or less, preferably −75 Kpa or less, and more preferably −85 Kpa or less. Heating and kneading in such a pressure atmosphere can remove moisture held in the polyolefin and anhydrous magnesium sulfate, and can particularly inhibit evaporation of moisture held in anhydrous magnesium sulfate per se serving as a hygroscopic inorganic filler, due to heat during heating and kneading, which causes secondary aggregation of the hygroscopic inorganic matter filler per se due to the evaporated moisture, leading to poor dispersion.

The temperature and time for kneading the polyolefin and anhydrous magnesium sulfate may be appropriately set so that the above-mentioned moisture content will be satisfied, depending on the pressure atmosphere adopted and the amounts to be supplied, for example. The temperature during kneading may typically be 130 to 250° C., preferably 150 to 230° C., and more preferably 170 to 210° C.

The polyolefin and anhydrous magnesium sulfate can be kneaded using a two-screw kneading extruder having a pressure-reducing function, for example. The polyolefin and anhydrous magnesium sulfate may be supplied into the raw material hopper of the two-screw kneading extruder, either by using a mixture thereof previously prepared in a common mixer, or by supplying fixed amounts of these components into the raw material hopper. In this case, the raw material hopper has been preferably nitrogen-purged, for example, to prevent moisture absorption by the polyolefin and anhydrous magnesium sulfate.

The polyolefin composition of the present invention is used as a molding raw material for various molded articles.

2. Molded Article

The above-described polyolefin composition can be molded into a molded article having any shape, using a common molding method such as extrusion molding, co-extrusion molding, injection molding, or blow molding.

The shape of the molded article molded from the above-described polyolefin composition is not particularly limited, and may be appropriately set depending on the use of the molded article, for example. Examples of shapes include a film shape, a sheet shape, and a plate shape.

While the molded article molded from the above-described polyolefin composition is not particularly limited in use, because the molded article exhibits a hygroscopic ability derived from anhydrous magnesium sulfate, it is suitable for use as a packaging body for a product that requires the prevention of moisture absorption. Furthermore, because the molded article is substantially free of an additive other than anhydrous magnesium sulfate, and can prevent bleed-out of an additive, it is particularly suitable for use as a packaging body for a product that requires both the prevention of moisture absorption and the prevention of mixing of an additive. Specific examples of such products include pharmaceuticals, pharmaceutical raw materials, food products, and food raw materials. In particular, a powdery dialysis agent, a raw material of a dialysis agent, and a raw material of an infusion are products that require a high degree of prevention of moisture absorption and prevention of mixing of an additive, and the molded article is particularly suitable for use as a packaging body for these products.

When the above-described molded article is used as a packaging body, the shape of the packaging body is not particularly limited, and may be any of a bag shape, a bottle shape, and the like.

When the above-described molded article is used as a packaging body, the packaging body may be a monolayer packaging body formed of a molded article prepared by molding the above-described polyolefin composition into a film or a sheet. In this case, however, the packaging body preferably has a laminated structure in which a resin layer is laminated on one or both surfaces of the layer formed of the molded article prepared by molding the above-described polyolefin composition into a film or a sheet (hereinafter sometimes also denoted as the "hygroscopic layer").

When the molded article is used as the above-described packaging body with a laminated structure, examples of resins forming the above-described resin layer include, but are not particularly limited to, polyolefins such as polyethylene and polypropylene; polyesters such as polyethylene terephthalate; and polyamides such as nylon. Of these resins, a polyolefin, particularly polyethylene, is suitable as the resin for use as the resin layer, because it has heat-sealing properties and readily achieves hermetic sealing of the container, and additionally, is easy to mold. Furthermore, in the above-described packaging body with a laminated structure, the resin layer provided on one or both surfaces of the hygroscopic layer is preferably free of an additive, from the viewpoint of preventing bleed-out of an additive from the packaging body.

A preferred embodiment of the above-described packaging body with a laminated structure includes a packaging body with a laminated structure in which the resin layer is laminated at least on an inner surface of the hygroscopic layer; and a more preferred embodiment of the above-described packaging body with a laminated structure includes a packaging body with a laminated structure in which the resin layer is laminated on both surfaces of the hygroscopic layer.

When the molded article is the above-described packaging body with a laminated structure, the thickness of each layer is not particularly limited: for example, the thickness of the hygroscopic layer may be 20 to 100 µm, preferably 30 to 80 µm, and more preferably 40 to 80 µm; and the thickness of the resin layer provided on one or both surfaces of the hygroscopic layer may be 10 to 50 µm, preferably 10 to 40 µm, and more preferably 15 to 40 µm.

Furthermore, the above-described packaging body with a laminated structure may include a barrier layer having a water vapor barrier function on an outer side of the hygroscopic layer, to be imparted with the water vapor barrier function. The barrier layer is not particularly limited as long as it exhibits a barrier function against water vapor, and examples of the barrier layer include metal foil such as aluminum foil; and vapor-deposited films of inorganic compounds such as aluminum oxide and silica. The thickness of the barrier layer may be 5 to 40 µm, for example, preferably 5 to 30 µm, and more preferably 10 to 30 µm, although not particularly limited thereto.

Suitable embodiments of the laminated structure of the packaging body with the barrier layer include a structure in which the resin layer, the hygroscopic layer, and the barrier layer are laminated in this order from the inner side; and a structure in which the resin layer, the hygroscopic layer, the barrier layer, and the resin layer are laminated in this order from the inner side.

EXAMPLES

The present invention will be specifically described hereinafter with reference to test examples and the like; however, the invention should not be construed as being limited to these test examples.

Note that anhydrous magnesium sulfate used in the examples and comparative examples shown below had a mean particle diameter of 3 to 7 µm as measured with a laser diffraction/scattering particle size distribution measuring apparatus ("Microtrac HRA Particle Size Analyzer" (model number: 9320-X100); Nikkiso Co., Ltd.), and had a moisture content of 0.5 to 2%.

Test Example 1

1-1. Production of a Polyolefin Composition and Films

Comparative Example 1

The raw materials listed below were kneaded and extruded using a twin-screw kneading extruder (Twin Screw Extruder PCM-45; Ikegai Tekko Co., Ltd.) under the following conditions: resin temperature during kneading: 160 to 210° C., vent pressure: −88 kPa, extrusion rate: 25 to 50 kg/h; and the hopper for the supply of raw materials was nitrogen-purged. In this manner, a polyolefin composition in pellet form was obtained. Next, the polyolefin composition was extrusion-molded using a T-die film molding machine (PLABOR GT-25-A; PLABOR Research Laboratory of Plastics Technology Co., Ltd.), thereby obtaining a monolayer film with a thickness of 60 µm.

<Additive Raw Materials of the Polyolefin Composition>
Polyethylene (LDPE; trade name "UBE Polyethylene R300" (MFR 0.35); Ube-Maruzen Polyethylene Co., Ltd.): 66.25 wt %
Anhydrous magnesium sulfate: 33 wt %
Dispersant (zinc stearate): 0.5 wt %
Antioxidant (trade name "Irganox 1010"; BASF Japan Ltd.): 0.25 wt %

Comparative Example 2

Three materials, i.e., additive-free polyethylene (LDPE), the polyolefin composition prepared in Comparative Example 1, and additive-free polyethylene (LDPE), were co-extruded into three layers using a three-layer inflation molding machine (Heavy Industries Modern, Ltd.), thereby preparing a three-layer film in which a resin layer formed of the additive-free polyethylene (LDPE) (20-µm-thick inner layer), a hygroscopic layer formed of the polyolefin composition prepared in Comparative Example 1 (60-µm-thick intermediate layer), and a resin layer formed of the additive-free polyethylene (LDPE) (20-µm-thick outer layer) were laminated in this order.

1-2. Evaluation of Performance when in Use as Packaging Bodies for Sodium Chloride Using each of the films prepared above, a small bag (15 cm in length×20 cm in width) was prepared by heat sealing.

Five hundred grams of sodium chloride as defined in Japanese pharmacopoeia was placed in this small bag. The small bag was degassed, and heat-sealed with the inner bag and sodium chloride brought into intimate contact with each other. This product was stored for 28 days in a desiccator at 60° C. After 7, 14, 21, or 28 days from the storage, 500 g of sodium chloride within each of the small bags was dissolved in 2000 mL of purified water. Next, the solution was filtered through a membrane filter (diameter: 47 mm, pore size: 3 µm), and the filtration time and filtration pressure at that time were measured. The membrane filter was dried after the filtration, and a color difference was measured using COLOR METER ZE2000 (Nippon Denshoku Industries Co., Ltd.).

The results are shown in Table 1. As shown in Table 1, with both the monolayer film according to Comparative Example 1 and the three-layer film according to Comparative Example 2, the filtration rate was as low as 3 minutes or longer, and the filtration filter exhibited noticeable coloration (color difference), i.e., 1 or more. These results therefore confirmed that the additives (the dispersant and antioxidant) contained in each of the films bled out into sodium chloride within the inner bag, leading to a deterioration in quality.

due to bleed-out cannot be prevented. It was therefore revealed that the polyolefin composition used for forming the hygroscopic layer of the packaging body is preferably substantially free of an additive other than anhydrous magnesium sulfate.

TABLE 2

|  |  |  | After 7 Days | After 14 Days | After 21 Days | After 28 Days |
|---|---|---|---|---|---|---|
| Comparative Example 3 | Filtration Pressure (MPa) | At the Beginning | 0.096 | 0.096 | 0.096 | 0.096 |
|  |  | At the End | 0.096 | 0.096 | 0.096 | 0.096 |
|  | Filtration Time |  | 3 min 19 sec | 6 min 34 sec | 31 min 37 sec | 7 min 45 sec |
|  | Color Difference Measurement |  | 8.12 | 9.76 | 6.02 | 1.95 |

TABLE 1

|  |  |  | After 7 Days | After 14 Days | After 21 Days | After 28 Days |
|---|---|---|---|---|---|---|
| Comparative Example 1 | Filtration Pressure (MPa) | At the Beginning | 0.096 | 0.096 | 0.096 | 0.096 |
|  |  | At the End | 0.096 | 0.096 | 0.096 | 0.096 |
|  | Filtration Time |  | 8 min 39 sec | 10 min 24 sec | 28 min 48 sec | 9 min 35 sec |
|  | Color Difference Measurement |  | 8.08 | 10.99 | 10.18 | 4.34 |
| Comparative Example 2 | Filtration Pressure (MPa) | At the Beginning | 0.096 | 0.096 | 0.096 | 0.096 |
|  |  | At the End | 0.096 | 0.096 | 0.096 | 0.096 |
|  | Filtration Time |  | 3 min 56 sec | 12 min 00 sec | 10 min 50 sec | 13 min 53 sec |
|  | Color Difference Measurement |  | 10.91 | 12.35 | 12.30 | 5.09 |

Test Example 2

2-1. Production of a Packaging Bag

Comparative Example 3

A double-structure packaging body was prepared by covering a small bag (inner bag) formed of an additive-free polyethylene film (thickness: 80 µm) with a small bag (outer bag) formed of the three-layer film obtained in Comparative Example 2.

2-2. Evaluation of Performance when in Use as a Packaging Body for Sodium Chloride Five hundred grams of sodium chloride as defined in Japanese pharmacopoeia was placed in the inner bag of the double-structure packaging body, and the inner bag was heat-sealed. Next, the outer bag covering the inner bag was heat-sealed. This product was evaluated for bleed-out of the additives under the same conditions as employed in Test Example 1 above.

The results are shown in Table 2. These results confirmed that even if the additive-free polyethylene film with a thickness of 80 µm is used as the inner bag, mixing of the additives contained in the outer bag into sodium chloride Test Example 3

3-1. Production of Polyolefin Compositions and Films

Comparative Example 4

The raw materials listed below were kneaded and extruded using a twin-screw kneading extruder (Twin Screw Extruder PCM-45; Ikegai Tekko Co., Ltd.) under the same conditions as employed in Comparative Example 1, thereby obtaining a polyolefin composition in pellet form. Next, the polyolefin composition was extrusion-molded using a monolayer inflation molding machine YEI-S40V-60LS-R (Yoshii Tekko Co., Ltd.), thereby obtaining a monolayer film with a thickness of 60

<Additive Raw Materials of the Polyolefin Composition>
Polyethylene (LDPE; trade name "UBE Polyethylene R300" (MFR 0.35); Ube-Maruzen Polyethylene Co., Ltd.): 66.8 wt %
Anhydrous magnesium sulfate: 33 wt %
Antioxidant (trade name "Irganox 1010"; BASF Japan Ltd.): 0.2 wt %

Comparative Example 5

A polyolefin composition containing an antioxidant was obtained under the same conditions as employed in Comparative Example 4 above, except that the antioxidant was replaced with the trade name "Irganox 1330" (BASF Japan Ltd.). Next, the polyolefin composition was extrusion-molded using a monolayer inflation molding machine YEI-S40V-60LS-R (Yoshii Tekko Co., Ltd.), thereby obtaining a monolayer film with a thickness of 60 μm.

Comparative Example 6

A polyolefin composition containing an antioxidant was obtained under the same conditions as employed in Comparative Example 4 above, except that the antioxidant was replaced with the trade name "ADK STAB AO-60" (Adeka Corporation). Next, the polyolefin composition was extrusion-molded using a monolayer inflation molding machine YEI-S40V-60LS-R (Yoshii Tekko Co., Ltd.), thereby obtaining a monolayer film with a thickness of 60 μm.

3-2. Evaluation of Performance when in Use as Packaging Bodies for Sodium Chloride The monolayer films were evaluated for bleed-out of the additive under the same conditions as employed in Test Example 1 above.

The results are shown in Table 3. These results showed that although the filtration time was improved through the use of the monolayer films not containing a dispersant, all the monolayer films exhibited a color difference of 1 or more, which confirmed that mixing of an antioxidant into sodium chloride due to bleed-out cannot be prevented even if the type of the antioxidant is changed.

TABLE 3

| Items | | | After 7 Days | After 14 Days | After 21 Days | After 28 Days |
|---|---|---|---|---|---|---|
| Comparative Example 4 | Filtration Pressure (MPa) | At the Beginning | 0.096 | 0.096 | 0.096 | 0.096 |
| | | At the End | 0.096 | 0.096 | 0.096 | 0.096 |
| | Filtration Time | | 1 min 57 sec | 1 min 48 sec | 2 min 14 sec | 2 min 00 sec |
| | Color Difference Measurement | | 1.25 | 1.87 | 2.11 | 2.60 |
| Comparative Example 5 | Filtration Pressure (MPa) | At the Beginning | 0.096 | 0.096 | 0.096 | 0.096 |
| | | At the End | 0.096 | 0.096 | 0.096 | 0.096 |
| | Filtration Time | | 1 min 39 sec | 1 min 54 sec | 2 min 14 sec | 1 min 49 sec |
| | Color Difference Measurement | | 0.98 | 1.31 | 1.00 | 1.34 |
| Comparative Example 6 | Filtration Pressure (MPa) | At the Beginning | 0.096 | 0.096 | 0.096 | 0.096 |
| | | At the End | 0.096 | 0.096 | 0.096 | 0.096 |
| | Filtration Time | | 1 min 45 sec | 1 min 50 sec | 1 min 57 sec | 2 min 25 sec |
| | Color Difference Measurement | | 1.92 | 2.30 | 2.07 | 2.49 |

Test Example 4

4-1. Production of Polyolefin Compositions and Films

Example 1

The raw materials listed below were kneaded and extruded using a twin-screw kneading extruder (Twin Screw Extruder PCM-45; Ikegai Tekko Co., Ltd.) under the following conditions: resin temperature during kneading: 160 to 210° C., vent pressure: −88 kPa, extrusion rate: 25 to 50 kg/h; and the hopper for the supply of raw materials was nitrogen-purged. In this manner, a polyolefin composition in pellet form was obtained. Next, the polyolefin composition was extrusion-molded using a monolayer inflation molding machine YEI-S40V-60LS-R (Yoshii Tekko Co., Ltd.), thereby obtaining a monolayer film with a thickness of 60 μm.

<Additive Raw Materials of the Polyolefin Composition>
Polyethylene (LDPE; trade name "UBE Polyethylene R300" (MFR 0.35); Ube-Maruzen Polyethylene Co., Ltd.): 67 wt %
Anhydrous magnesium sulfate: 33 wt %

Example 2

The raw materials listed below were kneaded and extruded using a twin-screw kneading extruder (Twin Screw Extruder PCM-45; Ikegai Tekko Co., Ltd.) under the same conditions as employed in Example 1 above, thereby obtaining a polyolefin composition in pellet form. Next, the polyolefin composition was extrusion-molded using a monolayer inflation molding machine YEI-S40V-60LS-R (Yoshii Tekko Co., Ltd.), thereby obtaining a monolayer film with a thickness of 60 μm.

<Additive Raw Materials of the Polyolefin Composition>
Polyethylene (LDPE; trade name "UBE Polyethylene R300" (MFR 0.35); Ube-Maruzen Polyethylene Co., Ltd.): 66.96 wt %
Anhydrous magnesium sulfate: 33 wt %
Antioxidant (trade name "ADK STAB AO-60"; Adeka Corporation): 0.04 wt %

Example 3

A polyolefin composition was obtained under the same conditions as employed in Example 2 above, except that the amount of polyethylene added was changed to 66.99 wt %, and the amount of the antioxidant added was changed to 0.01 wt %. Next, the polyolefin composition was extrusion-molded using a monolayer inflation molding machine YEI-S40V-60LS-R (Yoshii Tekko Co., Ltd.), thereby obtaining a monolayer film with a thickness of 60 μm.

4-2. Evaluation of Performance when in Use as Packaging Bodies for Sodium Chloride The monolayer films were evaluated for bleed-out of the additive under the same conditions as employed in Test Example 1 above.

The results are shown in Table 4. These results showed that the monolayer film not containing an additive other than anhydrous magnesium sulfate (Example 1) exhibited short filtration times and sufficiently low values of color difference, which confirmed that the monolayer film can inhibit mixing of an additive into sodium chloride due to bleed-out. The results also showed that the monolayer films containing the antioxidant in very small amounts, i.e., 0.04 wt % or less (that is, amounts such that the antioxidant function cannot substantially be demonstrated) (Examples 2 and 3), exhibited filtration times and color differences comparable to those of the monolayer film according to Example 1 not containing an antioxidant, which confirmed that these monolayer films can inhibit mixing of the antioxidant into sodium chloride due to bleed-out.

TABLE 4

| | Items | | After 7 Days | After 14 Days | After 21 Days | After 28 Days |
|---|---|---|---|---|---|---|
| Example 1 | Filtration Pressure (MPa) | At the Beginning | 0.096 | 0.096 | 0.096 | 0.096 |
| | | At the End | 0.096 | 0.096 | 0.096 | 0.096 |
| | Filtration Time | | 2 min 04 sec | 1 min 47 sec | 1 min 52 sec | 1 min 58 sec |
| | Color Difference Measurement | | 0.71 | 0.40 | 0.42 | 1.00 |
| Example 2 | Filtration Pressure (MPa) | At the Beginning | 0.096 | 0.096 | 0.096 | 0.096 |
| | | At the End | 0.096 | 0.096 | 0.096 | 0.096 |
| | Filtration Time | | 1 min 50 sec | 2 min 01 sec | 2 min 20 sec | 1 min 55 sec |
| | Color Difference Measurement | | 0.77 | 0.43 | 0.57 | 0.74 |
| Example 3 | Filtration Pressure (MPa) | At the Beginning | 0.096 | 0.096 | 0.096 | 0.096 |
| | | At the End | 0.096 | 0.096 | 0.096 | 0.096 |
| | Filtration Time | | 1 min 41 sec | 1 min 55 sec | 2 min 01 sec | 1 min 49 sec |
| | Color Difference Measurement | | 0.77 | 0.91 | 0.58 | 0.74 |

Test Example 5

5-1. Production of a Polyolefin Composition and Films

Comparative Example 7

The raw materials listed below were kneaded and extruded using a twin-screw kneading extruder similar to that described above, thereby obtaining 92 kg of a polyolefin composition in pellet form. Note, however, that although a vacuum pump was operating in the twin-screw kneading extruder, it drew in air simultaneously, and thus, the level of reduced pressure was low. The moisture content in the resulting polyolefin composition in pellet form was therefore 0.118 wt %. Next, the polyolefin composition was extrusion-molded using a monolayer inflation molding machine YEI-S40V-60LS-R (Yoshii Tekko Co., Ltd.), thereby obtaining a monolayer film with a thickness of 60 µm. In addition to this, separately, additive-free polyethylene (LDPE), the polyolefin composition obtained above, and additive-free polyethylene (LDPE) were co-extruded into three layers using an air-cooled inflation multilayer film making apparatus (Placo Co., Ltd.), thereby preparing a three-layer film in which a resin layer formed of the additive-free polyethylene (LDPE) (20-µm-thick inner layer), a hygroscopic layer formed of the above-described polyolefin composition (60-µm-thick intermediate layer), and a resin layer formed of the additive-free polyethylene (LDPE) (20-µm-thick outer layer) were laminated in this order.

<Additive Raw Materials of the Polyolefin Composition>
Polyethylene (LDPE; trade name "UBE Polyethylene R300" (MFR 0.35); Ube-Maruzen Polyethylene Co., Ltd.): 66.8 wt %
Anhydrous magnesium sulfate: 33 wt %
Antioxidant (trade name "ADK STAB AO-60"; Adeka Corporation): 0.2 wt %

5-2. Evaluation of Appearance Characteristics, as Well as Performance when in Use as a Packaging Body for Sodium Chloride Observation of the appearance of the monolayer film obtained above showed the presence of a large number of aggregates of anhydrous magnesium sulfate serving as a hygroscopic inorganic filler. Moreover, the number of aggregates with a size of 100 µm or more was counted by observing the monolayer film under a microscope. This showed the presence of 94720 aggregates per m², which revealed very poor dispersibility of anhydrous magnesium sulfate.

Moreover, observation of the appearance of the three-layer film obtained above showed a large number of voids formed in the film, which revealed that the film was not acceptable for use as a product.

Furthermore, the three-layer film was evaluated for bleed-out of the additive under the same conditions as employed in Test Example 1 above. The results are shown in Table 5. These results showed that the three-layer film is improved in filtration time, but exhibits a color difference of 1 or more, and hence, cannot prevent mixing of the antioxidant into sodium chloride due to bleed-out.

TABLE 5

| | Items | | After 7 Days | After 14 Days | After 21 Days | After 28 Days |
|---|---|---|---|---|---|---|
| Comparative Example 7 (Three-Layer Film) | Filtration Pressure (MPa) | At the Beginning | 0.096 | 0.096 | 0.096 | 0.096 |
| | | At the End | 0.096 | 0.096 | 0.096 | 0.096 |
| | Filtration Time | | 1 min 55 sec | 1 min 59 sec | 2 min 00 sec | 2 min 02 sec |
| | Color Difference Measurement | | 1.03 | 1.89 | 2.24 | 1.64 |

Test Example 6

6-1. Production of Polyolefin Compositions and Films

Examples 4 to 6 and Comparative Example 8

The raw materials listed below were kneaded and extruded using a twin-screw kneading extruder (Twin Screw Extruder PCM-45; Ikegai Tekko Co., Ltd.) under the same conditions as employed in Example 1 above, except that the pressure atmosphere was not under reduced pressure (Comparative example 8), or was changed to −61 KPa (Example 4), −76 KPa (Example 5), or −88 KPa (Example 6) by adjusting the vent pressure, thereby obtaining 3 kg each of polyolefin compositions in pellet form. Next, each of the polyolefin compositions was extrusion-molded using a T-die film molding machine (PLABOR GT-25-A; PLABOR Research Laboratory of Plastics Technology Co., Ltd.), thereby obtaining a monolayer film with a thickness of 60 μm.

<Additive Raw Materials of the Polyolefin Composition>
Polyethylene (LDPE; trade name "UBE Polyethylene F120N" (MFR 1.2); Ube-Maruzen Polyethylene Co., Ltd.): 67 wt %
Anhydrous magnesium sulfate: 33 wt %

6-2. Evaluation of Moisture Contents in the Polyolefin Compositions and Appearances of the Films The moisture content in each of the polyolefin compositions obtained above was measured using a Karl Fischer moisture meter (250° C., 1 g, an automatic moisture meter EV-200 (Hiranuma Sangyo Co., Ltd.)). Furthermore, the number of aggregates with a size of 100 μm or more present per m$^2$ was counted by observing the appearance of each of the monolayer films obtained above under a microscope.

The results are shown in Table 6 and FIG. 1. These results revealed that when the pressure was not reduced during kneading of polyethylene and anhydrous magnesium sulfate (Comparative Example 8), the polyolefin composition had a moisture content over 0.15 wt % and very poor dispersibility of anhydrous magnesium sulfate, and had poor moldability because the monolayer film included a large number of aggregates and a large number of pinholes. In contrast, the results clarified that when polyethylene and anhydrous magnesium sulfate were kneaded under reduced pressure (Examples 4 to 6), the polyolefin compositions had a moisture content of 0.1 wt % or less and good dispersibility of anhydrous magnesium sulfate, and had good moldability because the monolayer films were inhibited from the formation of aggregates, and had no pinholes. In particular, the polyolefin compositions obtained by kneading polyethylene and anhydrous magnesium sulfate at −76 KPa or less (Examples 5 and 6) significantly inhibited the formation of aggregates.

The foregoing results showed that in order to produce a polyolefin composition that is practically applicable without adding an additive other than anhydrous magnesium sulfate, the polyolefin composition may have a moisture content of 0.1 wt % or less to have satisfactory dispersibility of anhydrous magnesium sulfate. The results also revealed that this may be accomplished by reducing the pressure atmosphere in the kneader to approximately −65 KPa or less.

TABLE 6

|  | Comparative Example 8 | Example 4 | Example 5 | Example 6 |
|---|---|---|---|---|
| Pressure Reduction during Kneading | No | Yes | Yes | Yes |
| Vacuum Pressure (KPa) during Kneading | 0 | −61 | −76 | −88 |
| Moisture Content (wt %) in the Polyolefin Composition | 0.151 | 0.098 | 0.082 | 0.060 |
| Number of Aggregates Present per m$^2$ of the Monolayer Film | Unmeasurable | 1030 | 160 | 50 |
| Appearance of the Monolayer Film | Poor with a Large Number of Pinholes | Good | Excellent | Excellent |

Test Example 7

7-1. Production of Polyolefin Compositions and Films

Example 7

The raw materials listed below were kneaded and extruded using a twin-screw kneading extruder (Twin Screw Extruder PCM-45; Ikegai Tekko Co., Ltd.) under the same conditions as employed in Example 1 above (pressure atmosphere: −88 KPa), thereby obtaining 200 kg of a polyolefin composition in pellet form. Next, three materials, i.e., additive-free polyethylene (LDPE), the polyolefin composition obtained above, and additive-free polyethylene (LDPE), were co-extruded into three layers using a three-layer inflation molding machine (Heavy Industries Modern, Ltd.), thereby preparing a three-layer film in which a resin layer formed of the additive-free polyethylene (LDPE) (20-μm-thick inner layer), a hygroscopic layer formed of the above-described polyolefin composition (60-μm-thick intermediate layer), and a resin layer formed of the additive-free polyethylene (LDPE) (20-μm-thick outer layer) were laminated in this order.

<Raw Material Composition of the Polyolefin Composition>
Polyethylene (LDPE; trade name "UBE Polyethylene R300" (MFR 0.35); Ube-Maruzen Polyethylene Co., Ltd.): 67 wt %
Anhydrous magnesium sulfate: 33 wt %

Example 8

Three materials, i.e., additive-free polyethylene (LDPE), the polyolefin composition obtained in Example 7 above, and additive-free polyethylene (LLDPE), were co-extruded into three layers using a three-layer inflation molding machine (Heavy Industries Modern, Ltd.), thereby preparing a three-layer film in which a resin layer formed of the additive-free polyethylene (LDPE) (20-μm-thick inner layer), a hygroscopic layer formed of the polyolefin composition obtained in Example 7 above (60-μm-thick intermediate layer), and a resin layer formed of the additive-free polyethylene (LLDPE) (20-μm-thick outer layer) were laminated in this order.

Example 9

The raw materials listed below were kneaded and extruded using a twin-screw kneading extruder PCM-80 (Ikegai Tekko Co., Ltd.) under the same conditions as employed in Example 1 above (pressure atmosphere: −88 KPa), thereby obtaining a polyolefin composition in pellet form. Next, additive-free polyethylene (LDPE), the polyolefin composition obtained above, and additive-free polyethylene (LLDPE) were co-extruded into three layers using an air-cooled inflation multilayer film making apparatus (Placo Co., Ltd.), thereby preparing a three-layer film in which a resin layer formed of the additive-free polyethylene (LDPE) (20-μm-thick inner layer), a hygroscopic layer formed of the above-described polyolefin composition (60-μm-thick intermediate layer), and a resin layer formed of the additive-free polyethylene (LLDPE) (20-μm-thick outer layer) were laminated in this order.

<Raw Material Composition of the Polyolefin Composition>

Polyethylene (LDPE; trade name "UBE Polyethylene F120N (MFR 1.2)"; Ube-Maruzen Polyethylene Co., Ltd.): 67 wt %

Anhydrous magnesium sulfate: 33 wt %

7-2. Evaluation of Moisture Contents in the Polyolefin Compositions, Appearances of the Films, and Performance when in Use as Packages for Sodium Chloride Observation of the appearance of each of the three-layer films obtained in Examples 7 to 9 under a microscope confirmed that the formation of aggregates with a size of 100 μm or more was sufficiently inhibited, and anhydrous magnesium sulfate was dispersed well.

Moreover, moisture contents in the polyolefin compositions obtained in Example 7 (identical to that of Example 8) and Example 9 were measured as in Test Example 6 above. Furthermore, moisture contents in the polyolefin compositions obtained in Examples 1 to 3 above were similarly measured. The results are shown in Table 7. These results showed that all the polyolefin compositions obtained in Examples 1 to 3, 7 and 9 had a moisture content of 0.1 wt % or less. Specifically, these test results also confirmed that in the production of a polyolefin composition without adding an additive other than anhydrous magnesium sulfate, the polyolefin and anhydrous magnesium sulfate may be kneaded so that the moisture content becomes 0.1 wt % or less, to achieve excellent dispersibility of anhydrous magnesium sulfate and good moldability.

TABLE 7

| | Moisture Content (wt %) in the Polyolefin Composition |
|---|---|
| Example 1 | 0.054 |
| Example 2 | 0.066 |
| Example 3 | 0.068 |
| Example 7 (Identical to Example 8) | 0.064 |
| Example 9 | 0.069 |

Furthermore, the three-layer films obtained in Examples 7 to 9 were evaluated for bleed-out of an additive under the same conditions as employed in Test Example 1 above. The results are shown in Table 8. These results showed that all these three-layer films have sufficiently short filtration times, and maintain low values of color difference, and hence, can prevent an adverse effect on sodium chloride housed therein.

TABLE 8

| | Items | | After 7 Days | After 14 Days | After 21 Days | After 28 Days |
|---|---|---|---|---|---|---|
| Example 7 | Filtration Pressure (MPa) | At the Beginning | 0.096 | 0.096 | 0.096 | 0.096 |
| | | At the End | 0.096 | 0.096 | 0.096 | 0.096 |
| | Filtration Time | | 1 min 51 sec | 1 min 59 sec | 1 min 58 sec | 2 min 04 sec |
| | Color Difference Measurement | | 0.13 | 0.08 | 0.06 | 0.11 |
| Example 8 | Filtration Pressure (MPa) | At the Beginning | 0.096 | 0.096 | 0.096 | 0.096 |
| | | At the End | 0.096 | 0.096 | 0.096 | 0.096 |
| | Filtration Time | | 1 min 43 sec | 1 min 43 sec | 1 min 44 sec | 1 min 49 sec |
| | Color Difference Measurement | | 0.35 | 0.31 | 0.28 | 0.16 |
| Example 9 | Filtration Pressure (MPa) | At the Beginning | 0.096 | 0.096 | 0.096 | 0.096 |
| | | At the End | 0.096 | 0.096 | 0.096 | 0.096 |
| | Filtration Time | | 1 min 57 sec | 1 min 50 sec | 2 min 02 sec | 2 min 00 sec |
| | Color Difference Measurement | | 0.68 | 0.27 | 0.44 | 0.47 |

Test Example 8

Effects on the contents were evaluated under the same conditions as employed in Test Example 1 above, except for the following: small bags (17 cm in length×25 cm in width) were prepared using the three-layer films prepared in Example 9 and Comparative Example 2; in place of sodium chloride as defined in Japanese pharmacopoeia, 500 g each of potassium chloride, anhydrous sodium acetate, sodium bicarbonate, or glucose was used; and sodium bicarbonate was dissolved in 8000 mL of purified water.

The results are shown in Tables 9 to 12. These results showed that the three-layer film obtained in Example 9 can store the raw materials of a dialysis agent other than sodium chloride (potassium chloride, anhydrous sodium acetate, sodium bicarbonate, and glucose) without any adverse effects on these raw materials. In contrast, the three-layer film obtained in Comparative Example 2 lengthens the filtration time, and significantly increases the color difference, and hence, has adverse effects due to bleed-out of the additives.

TABLE 9

When Potassium Chloride was Housed

| | Items | | After 7 Days | After 14 Days | After 21 Days |
|---|---|---|---|---|---|
| Example 9 | Filtration Pressure (MPa) | At the Beginning | 0.096 | 0.096 | 0.096 |
| | | At the End | 0.096 | 0.096 | 0.096 |
| | Filtration Time | | 1 min 57 sec | 1 min 52 sec | 1 min 50 sec |
| | Color Difference Measurement | | 0.58 | 0.57 | 0.81 |
| Comparative Example 2 | Filtration Pressure (MPa) | At the Beginning | 0.096 | 0.096 | 0.096 |
| | | At the End | 0.096 | 0.096 | 0.096 |
| | Filtration Time | | 15 min 30 sec | 22 min 26 sec | 21 min 31 sec |
| | Color Difference Measurement | | 3.13 | 5.10 | 7.53 |

TABLE 10

When Anhydrous Sodium Acetate was Housed

| | Items | | After 7 Days | After 14 Days | After 21 Days |
|---|---|---|---|---|---|
| Example 9 | Filtration Pressure (MPa) | At the Beginning | 0.096 | 0.096 | 0.096 |
| | | At the End | 0.096 | 0.096 | 0.096 |
| | Filtration Time | | 2 min 15 sec | 3 min 11 sec | 2 min 41 sec |
| | Color Difference Measurement | | 0.39 | 0.26 | 0.49 |
| Comparative Example 2 | Filtration Pressure (MPa) | At the Beginning | 0.096 | 0.096 | 0.096 |
| | | At the End | 0.096 | 0.096 | 0.096 |
| | Filtration Time | | 19 min 52 sec | 19 min 28 sec | 37 min 49 sec |
| | Color Difference Measurement | | 1.15 | 1.16 | 1.08 |

TABLE 11

When Glucose was Housed

| | Items | | After 7 Days | After 14 Days | After 21 Days |
|---|---|---|---|---|---|
| Example 9 | Filtration Pressure (MPa) | At the Beginning | 0.096 | 0.096 | 0.096 |
| | | At the End | 0.096 | 0.096 | 0.096 |
| | Filtration Time | | 2 min 21 sec | 2 min 36 sec | 2 min 38 sec |
| | Color Difference Measurement | | 0.20 | 0.24 | 0.31 |
| Comparative Example 2 | Filtration Pressure (MPa) | At the Beginning | 0.096 | 0.096 | 0.096 |
| | | At the End | 0.096 | 0.096 | 0.096 |
| | Filtration Time | | 60 min or longer Stopped | 210 min or longer Stopped | 60 min or longer Stopped |

TABLE 12

When Sodium Bicarbonate was Housed

| | Items | | After 7 Days | After 14 Days | After 21 Days |
|---|---|---|---|---|---|
| Example 9 | Filtration Pressure (MPa) | At the Beginning | 0.096 | 0.096 | 0.096 |
| | | At the End | 0.096 | 0.096 | 0.096 |
| | Filtration Time | | 6 min 21 sec | 6 min 31 sec | 6 min 37 sec |
| | Color Difference Measurement | | 0.87 | 0.58 | 0.87 |
| Comparative Example 2 | Filtration Pressure (MPa) | At the Beginning | 0.096 | 0.096 | 0.096 |
| | | At the End | 0.096 | 0.096 | 0.096 |
| | Filtration Time | | 90 min or longer Stopped | 60 min or longer Stopped | 60 min or longer Stopped |

The invention claimed is:

1. A polyolefin composition comprising a kneaded product of a polyolefin and anhydrous magnesium sulfate, wherein, besides the polyolefin and the anhydrous magnesium sulfate, the polyolefin composition contains 0.04 wt % or less of any other additive, and wherein the polyolefin composition has a moisture content of 0.1 wt % or less, wherein the moisture content is a result of kneading the anhydrous magnesium sulfate into the polyolefin in a molten state, wherein the kneading is performed in a pressure atmosphere of −61 kPa or less.

2. The polyolefin composition according to claim 1, wherein the polyolefin is polyethylene.

3. The polyolefin composition according to claim 1, wherein a content of the anhydrous magnesium sulfate is 5 to 60 wt %.

4. The polyolefin composition according to claim 1, wherein the polyolefin is low density polyethylene (LDPE).

5. A molded article molded from the polyolefin composition according to claim 1.

6. The molded article according to claim 5, which is a bag- or bottle- shaped packaging body.

7. A bag- or bottle-shaped packaging body molded from the polyolefin composition according to claim 1, wherein a resin layer formed of the polyolefin is provided on one or both surfaces of a hygroscopic layer, the hygroscopic layer being formed by molding the polyolefin composition into a film or a sheet.

8. The molded article according to claim 7, wherein a barrier layer formed of metal foil or a vapor-deposited film of an inorganic compound is provided on an outer surface of the hygroscopic layer.

9. A method of housing a pharmaceutical, a food product, or a raw material thereof comprising placing the pharmaceutical, food product, or raw material thereof in the molded article according to claim 6.

10. The method according to claim 9, wherein the pharmaceutical, food product, or raw material thereof is a powdery dialysis agent, a raw material of a dialysis agent, or a raw material of an infusion.

11. A method for producing a polyolefin composition comprising the step of: kneading anhydrous magnesium sulfate into a polyolefin in a molten state, wherein the kneading is performed in a pressure atmosphere of −61 kPa or less, such that a moisture content of 0.1 wt % or less is produced in the resulting kneaded product, and wherein, besides the polyolefin and the anhydrous magnesium sulfate, the polyolefin composition contains 0.04 wt % or less of any other additive.

12. The method according to claim 11, wherein the kneading is performed in a pressure atmosphere at −65 kPa or less.

13. The method according to claim 11, wherein the polyolefin is LDPE.

* * * * *